(12) United States Patent
Tsai et al.

(10) Patent No.: US 12,242,307 B2
(45) Date of Patent: Mar. 4, 2025

(54) ELECTRONIC DEVICE WITH MOVABLE FOOT PAD

(71) Applicants: I-Hsuan Tsai, Taipei (TW); Chia-Wei Chen, Taipei (TW); Yu-Sheng Lai, Taipei (TW); Tzu-Chien Lai, Taipei (TW)

(72) Inventors: I-Hsuan Tsai, Taipei (TW); Chia-Wei Chen, Taipei (TW); Yu-Sheng Lai, Taipei (TW); Tzu-Chien Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 147 days.

(21) Appl. No.: 18/319,495

(22) Filed: May 18, 2023

(65) Prior Publication Data

US 2023/0376090 A1    Nov. 23, 2023

Related U.S. Application Data

(60) Provisional application No. 63/344,017, filed on May 19, 2022.

(51) Int. Cl.
*G06F 1/16* (2006.01)
*G06F 1/20* (2006.01)

(52) U.S. Cl.
CPC .............. *G06F 1/166* (2013.01); *G06F 1/203* (2013.01)

(58) Field of Classification Search
CPC ........ G06F 1/166; G06F 1/203; G06F 3/0208; H05K 5/0234
See application file for complete search history.

(56) References Cited

U.S. PATENT DOCUMENTS

| | | | |
|---|---|---|---|
| 6,290,517 B1 * | 9/2001 | Anderson ............. | G06F 1/1616 439/131 |
| 6,682,240 B1 * | 1/2004 | Chou .................... | G06F 3/0208 248/188.8 |
| 7,079,383 B2 * | 7/2006 | Homer ................... | G06F 1/166 361/679.41 |
| 8,537,546 B2 * | 9/2013 | Shih ..................... | H05K 5/0234 455/575.1 |

(Continued)

FOREIGN PATENT DOCUMENTS

| | | |
|---|---|---|
| CN | 110096120 | 5/2022 |
| TW | 201835709 | 10/2018 |
| TW | 202214088 | 4/2022 |

*Primary Examiner* — Nidhi Thaker
(74) *Attorney, Agent, or Firm* — JCIPRNET (57) ABSTRACT

An electronic device with movable foot pad, including a body and a foot pad module, is provided. The body has a bottom surface. The foot pad module includes a first foot pad, at least one second foot pad, and at least one rotating shaft connecting the first and second foot pads. The second foot pad is rotated relative to the first foot pad by the rotating shaft to switch the foot pad module between first and second states. An axial direction of the rotating shaft is inclined relative to the bottom surface. In the first state, the body is supported on the platform by the first and second foot pads. In the second state, the second foot pad is rotated 180 degrees relative to the first foot pad in the axial direction and protrudes from the first foot pad to support the body on the platform by the second foot pad.

14 Claims, 10 Drawing Sheets

(56) References Cited

U.S. PATENT DOCUMENTS

| | | | |
|---|---|---|---|
| 11,404,227 B1* | 8/2022 | Chu | .................. H01H 13/04 |
| 2009/0268397 A1* | 10/2009 | Tang | .................. G06F 3/0208 |
| | | | 361/679.55 |
| 2009/0268398 A1* | 10/2009 | Tang | .................. G06F 3/0208 |
| | | | 361/679.55 |
| 2010/0284146 A1* | 11/2010 | Hsu | .................. G06F 1/166 |
| | | | 248/371 |
| 2013/0161479 A1* | 6/2013 | Yu | .................. G06F 3/0208 |
| | | | 248/685 |
| 2021/0084132 A1* | 3/2021 | Chou | .................. G06F 1/1681 |
| 2024/0152187 A1* | 5/2024 | Wen | .................. G06F 1/203 |

* cited by examiner

| Dimension d1 (mm) | First included angle $\theta 1$ | Third included angle $\theta 3$ | Dimension d2 (mm) | Number |
|---|---|---|---|---|
| 15mm | 70 | 40 | 13.1 | 1 |
| | 65 | 50 | 14.41 | 2 |
| | 60 | 60 | 15.24 | 3 |
| | 55 | 70 | 15.63 | 4 |
| | 50 | 80 | 15.56 | 5 |
| | 45 | 90 | 15.09 | 6 |
| | 40 | 100 | 14.8 | 7 |
| | 35 | 110 | 14.14 | 8 |
| | 30 | 120 | 13.04 | 9 |
| | 25 | 130 | 11.49 | 10 |
| | 20 | 140 | 9.71 | 11 |

ELECTRONIC DEVICE WITH MOVABLE FOOT PAD

CROSS-REFERENCE TO RELATED APPLICATION

This application claims the priority benefit of U.S. provisional application Ser. No. 63/344,017, filed on May 19, 2022. The entirety of the above-mentioned patent application is hereby incorporated by reference herein and made a part of this specification.

BACKGROUND

Technical Field

The disclosure relates to an electronic device with foot pad, and in particular to an electronic device with movable foot pad.

Description of Related Art

Generally, a notebook computer may be placed on a supporting surface such as a desktop or may be placed on the lap of the user for use in a sitting position. However, especially a notebook computer with higher operating performance, the body tends to easily heat up after operating for a period of time. Therefore, when the notebook computer is placed on the desktop for use, if there is not sufficient space between the body and the desktop to dissipate heat in the body or supply cold air, the body may easily overheat, and electronic elements inside the body may even be damaged. Also, when the notebook computer is placed on the lap of the user for use, the overheating of the body may easily cause the thighs of the user to feel uncomfortable or even burn due to the high temperature.

Therefore, the user tries to raise the notebook computer in the above state, which can not only increase the heat dissipation space, but also improve the comfort and operating experience of the user during operation.

SUMMARY

The disclosure provides an electronic device with movable foot pad, which can be correspondingly adjusted in response to usage requirements, so as to have both heat dissipation function and operating experience.

An electronic device with movable foot pad of the disclosure includes a body and a foot pad module. The body has a bottom surface. The foot pad module includes a first foot pad, at least one second foot pad, and at least one rotating shaft. The first foot pad is fixed to the body. The rotating shaft connects the first foot pad and the second foot pad. The second foot pad is rotated relative to the first foot pad by the rotating shaft, so that the foot pad module is switched between a first state and a second state. An axial direction of the rotating shaft is inclined relative to the bottom surface. In the first state, the body is supported on the platform by the first foot pad and the second foot pad. In the second state, the second foot pad is rotated 180 degrees relative to the first foot pad in the axial direction and protrudes from the first foot pad, so that the body is supported on the platform by the second foot pad.

In an embodiment of the disclosure, the first foot pad has a first appearance surface, and the second foot pad has a second appearance surface and a hidden surface. In the first state, the hidden surface faces the body and is adjacent to the bottom surface. In the second state, the hidden surface is exposed from the body and faces the first appearance surface.

In an embodiment of the disclosure, the first foot pad has a first separation surface adjacent to the first appearance surface, and the second foot pad has a second separation surface adjacent to the second appearance surface. The first separation surface is parallel to and facing the second separation surface and is between the first appearance surface and the second appearance surface.

In an embodiment of the disclosure, the second foot pad has a contact surface, and the second appearance surface is between the second separation surface and the contact surface. In the first state, the contact surface is adjacent to the bottom surface, and in the second state, the contact surface is relatively away from the bottom surface.

In an embodiment of the disclosure, in the first state, a projection of the second foot pad has a first projection boundary, a second projection boundary, and a third projection boundary, the first projection boundary and the second projection boundary respectively correspond to the second separation surface and the hidden surface, the third projection boundary corresponds to the second appearance surface and is opposite to the second projection boundary, there is a first included angle between the first projection boundary and the third projection boundary, and the first included angle is 45 degrees to 70 degrees.

In an embodiment of the disclosure, in the first state, a projection of the first foot pad has a sixth projection boundary and a seventh projection boundary. The sixth projection boundary corresponds to the first separation surface, and the seventh projection boundary corresponds to the first appearance surface and is opposite to a bottom surface projection boundary. In the second state, there is a second included angle between the second projection boundary and the seventh projection boundary, and the second included angle is 40 degrees to 90 degrees.

In an embodiment of the disclosure, in the first state, the third projection boundary is coplanar with the seventh projection boundary.

In an embodiment of the disclosure, a length of the second projection boundary is 13 mm to 15 mm.

In an embodiment of the disclosure, in the first state, the first appearance surface and the second appearance surface are coplanar with each other, so that contours of the first foot pad and the second foot pad are consistent.

In an embodiment of the disclosure, the second foot pad has a hollow column, and the hollow column extends from the second separation surface and is sleeved on the rotating shaft.

In an embodiment of the disclosure, the second foot pad also has a stopping rib, and the first foot pad has a double-layer round hole with an opening formed on the first separation surface and a pair of stopping walls formed on the double-layer round hole. The rotating shaft and the hollow column are rotatably assembled into the double-layer round hole, and the pair of stopping walls are located on a moving path of the stopping rib.

In an embodiment of the disclosure, the foot pad module includes two second foot pads and two rotating shafts, which are respectively disposed at two opposite ends of the first foot pad.

In an embodiment of the disclosure, when the electronic device is in the second state, two hidden surfaces of the two second foot pads are opposite to each other.

In an embodiment of the disclosure, the electronic device further includes a pair of universal joints and a transmission member. The transmission member passes through the first foot pad, and the pair of universal joints are respectively disposed at two opposite ends of the transmission member. Each of the rotating shafts is connected between one of the pair of universal joints and one of the second foot pads.

Based on the above, the foot pad module is disposed on the bottom surface of the body of the electronic device. The first foot pad is fixed on the body, and the second foot pad is rotatably connected to the first foot pad through the rotating shaft, so that the second foot pad can rotate 180 degrees relative to the first foot pad to be switched between the first state and the second state. In the first state, the body is supported on the platform by the first foot pad and the second foot pad, and in the second state, the second foot pad protrudes from the first foot pad, so that the body is supported on the platform by the second foot pad.

Accordingly, through the movable configuration of the second foot pad and the first foot pad, the user can adjust the state of the foot pad module in response to requirements. In the second state, the second foot pad can deviate from the bottom surface and protrude from the first foot pad to further raise the body, so as to increase the space between the body and the platform. At the same time, in cooperation with the operation of a fan inside the body, heat dissipation air can be smoothly discharged from the body or cold air from the external environment can enter the body through the bottom surface of the body to achieve the heat dissipation effect. At the same time, the body raised by the second foot pad can therefore provide the user with a better operating experience.

DETAILED DESCRIPTION OF DISCLOSED EMBODIMENTS

Figure 1:
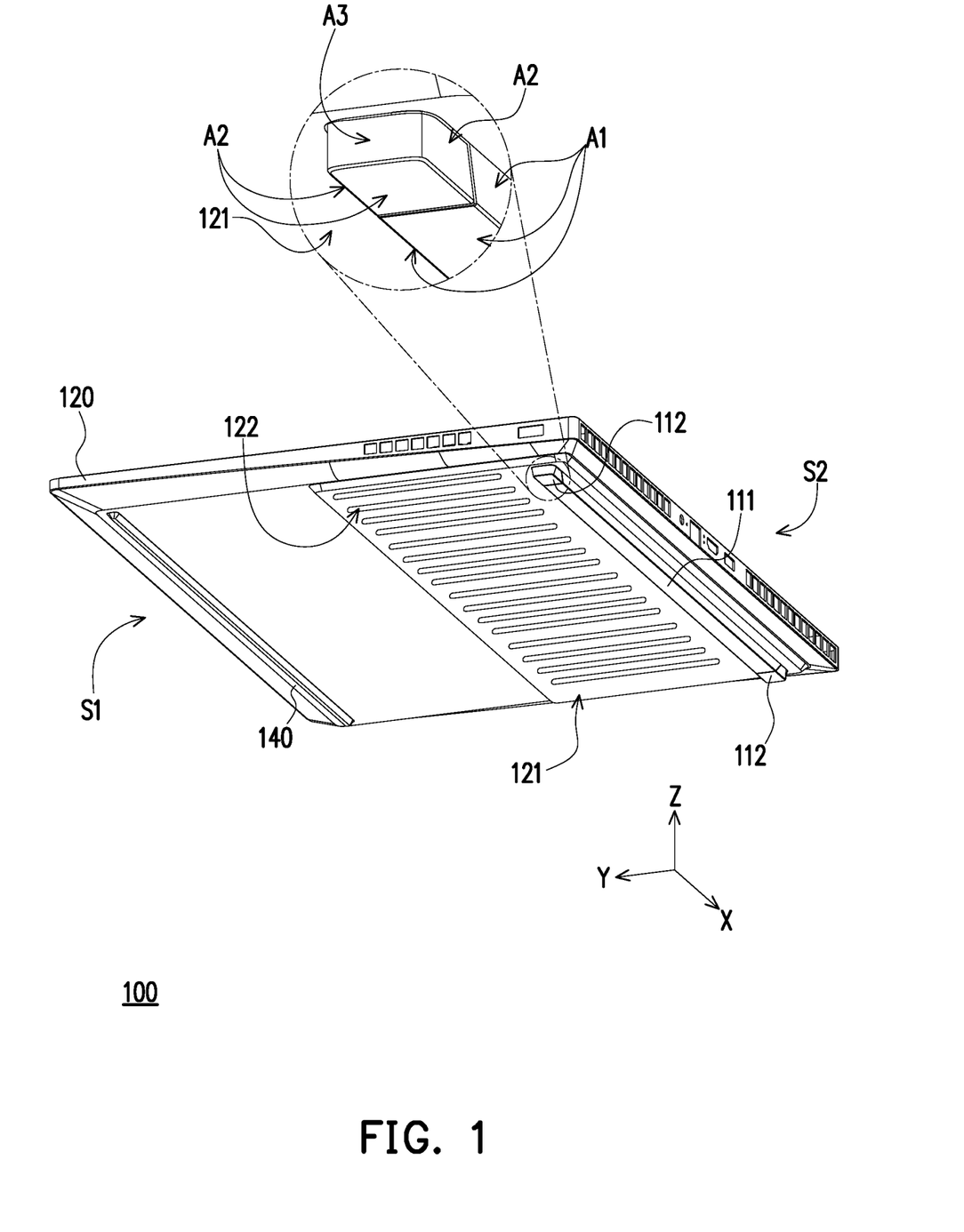
FIG. 1 is a schematic diagram of an electronic device according to an embodiment of the disclosure.
Figure 2:
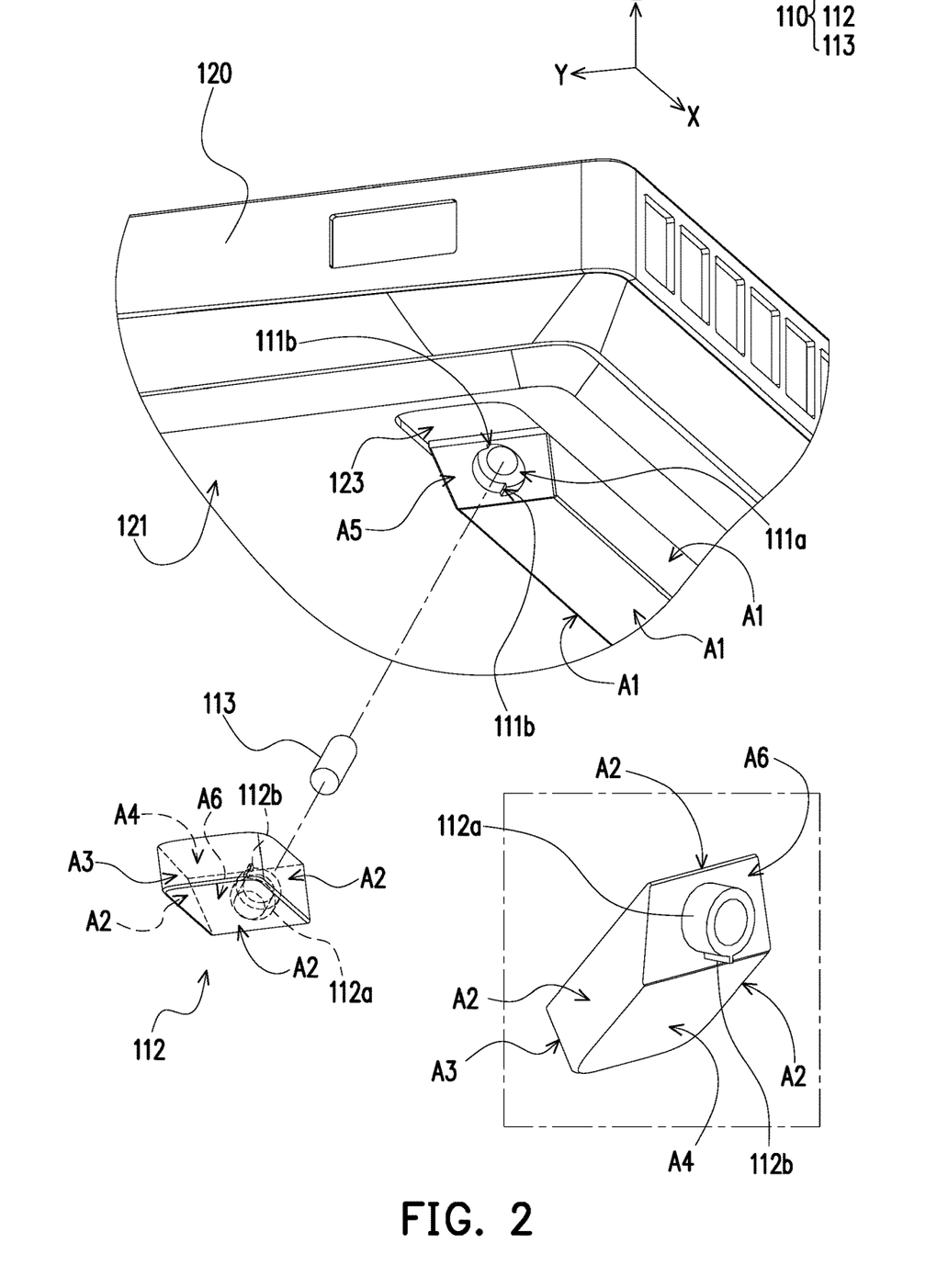
FIG. 2 is an exploded diagram of some components of the electronic device of FIG. 1.
Figure 3:
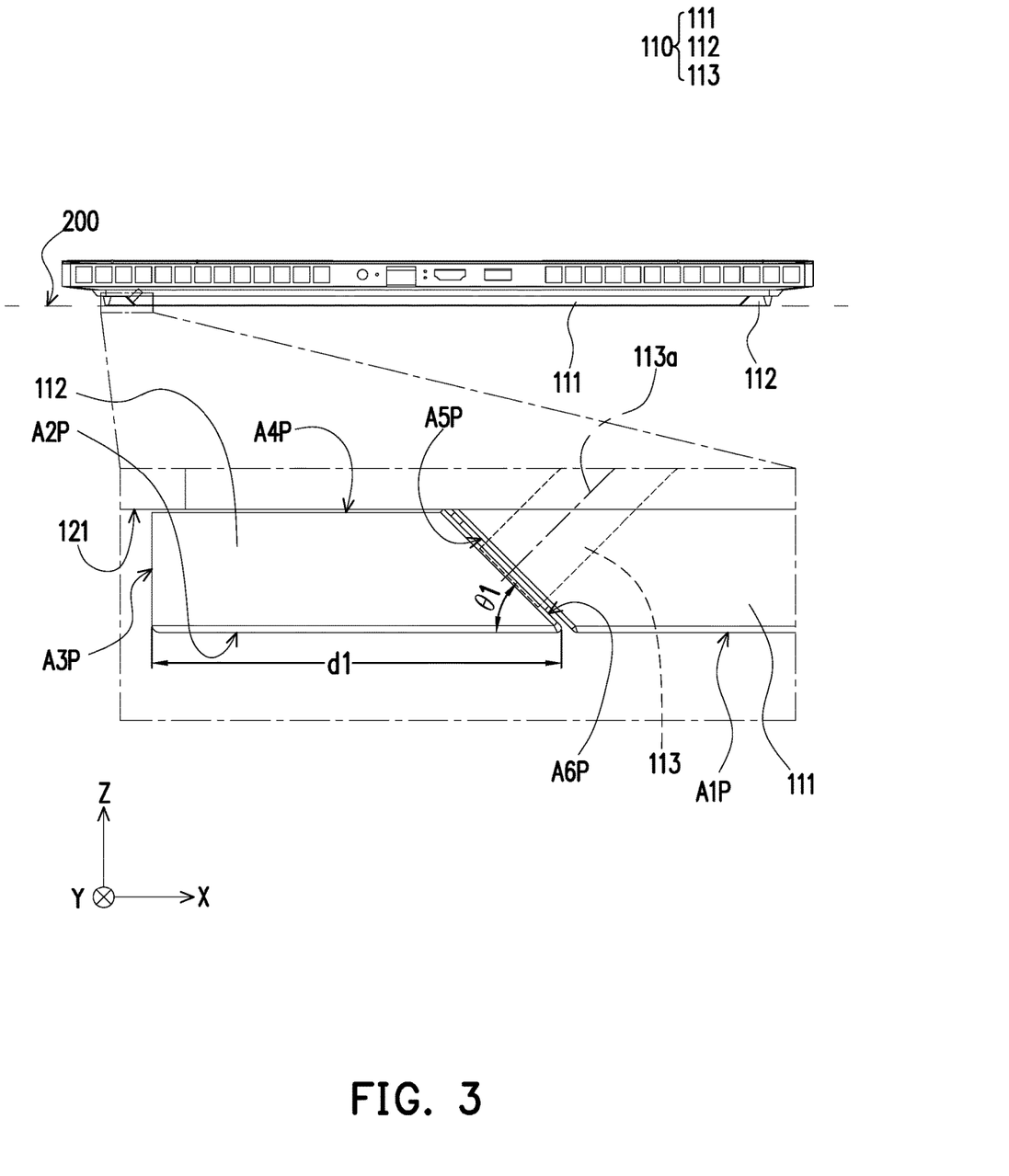
FIG. 3 and FIG. 4 respectively illustrate the electronic device of FIG. 1 from different viewing angles.
Figure 4:
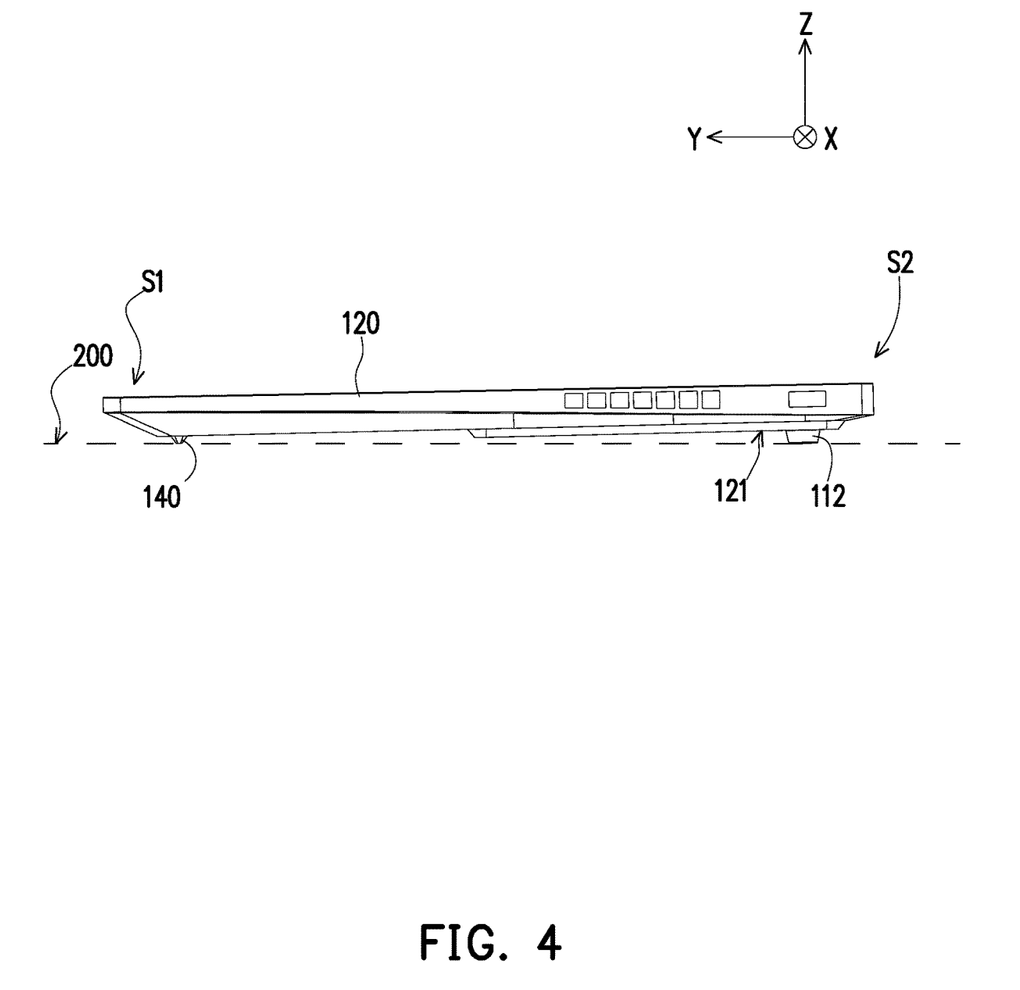

FIG. 1 is a schematic diagram of an electronic device according to an embodiment of the disclosure. FIG. 2 is an exploded diagram of some components of the electronic device of FIG. 1. FIG. 3 and FIG. 4 respectively illustrate the electronic device of FIG. 1 from different viewing angles. At the same time, the embodiment also provides cartesian coordinates X-Y-Z as a reference when describing the components. In addition, in order to facilitate the identification of the main characteristic components of the disclosure, unnecessary parts in the electronic device that are not related to the disclosure are omitted.

Please refer to FIG. 1 to FIG. 3 first. In the embodiment, an electronic device 100 is, for example, a notebook computer, which includes a body 120 and a foot pad module 110.

The body 120 has a bottom surface 121. The foot pad module 110 includes a first foot pad 111, at least one second foot pad 112, and at least one rotating shaft 113. Here, the embodiment is exemplified by one first foot pad 111 and respectively disposing two second foot pads 112 and two rotating shafts 113 at two opposite ends of the first foot pad 111, but not limited thereto. The first foot pad 111 is fixed on the body 120. The rotating shaft 113 connects the first foot pad 111 and the second foot pad 112. The second foot pad 112 is rotated relative to the first foot pad 111 by the rotating shaft 113, so that the foot pad module 110 can switch between a first state and a second state. For the detailed description of the states, please refer to the subsequent description of the related drawings. It should also be noted that in the embodiment, the bottom surface 121 of the body 120 is situated on the X-Y plane, so that the reference standard can be the same before and after the state of the foot pad module 110 is changed.

Please refer to FIG. 1, FIG. 3, and FIG. 4 at the same time, which show the first state of the foot pad module 110. At this time, the body 120 is supported on a platform 200 by the first foot pad 111 and the second foot pad 112 at the same time. It should be noted here that the body 120 of the electronic device 100 of the embodiment is divided into a front side S1 and a rear side S2 opposite to each other, wherein for the notebook computer, the front side S1 is also where the user is located, the foot pad module 110 is disposed on the rear side S2, and the electronic device 100 also includes a fixed foot pad 140 disposed on the front side S1. In other words, the electronic device 100 is supported on the platform 200 by the fixed foot pad 140 and the movable foot pad module 110 at the same time. In the first state, the first foot pad 111 is substantially coplanar with the second foot pad 112, and the fixed foot pad 140 may or may not be coplanar with the first foot pad 111 and the second foot pad 112. Here, the platform 200 is regarded as being situated on the X-Y plane or parallel to the X-Y plane.

Please refer to FIG. 1 and FIG. 2 again. It is worth mentioning that in the foot pad module 110 of the embodiment, the first foot pad 111 has a first appearance surface A1, and the second foot pad 112 has a second appearance surface A2 and a hidden surface A4. Furthermore, the first foot pad 111 also has a first separation surface A5 adjacent to the first appearance surface A1, and the second foot pad 112 also has a second separation surface A6 adjacent to the second appearance surface A2, wherein the first separation surface A5 is parallel to and facing the second separation surface A6 and is located between the first appearance surface A1 and the second appearance surface A2. In addition, the second foot pad 112 also has a contact surface A3, and the second appearance surface A2 is located between the second separation surface A6 and the contact surface A3. It should be noted that the appearance surface and the contact surface mean that the user can see the surface of the foot pad with naked eyes in the first state and the second state, the hidden surface means that the user cannot see the surface of the foot pad with naked eyes in the first state but can see the surface of the foot pad in the second state, and the separation surface means that the user cannot see the surface of the foot pad with naked eyes in both the first state and the second state.

In the first state as shown in FIG. 1 to FIG. 4, the hidden surface A4 of the foot pad module 110 faces the body 120 and is adjacent to the bottom surface 121, and the contact surface A3 is adjacent to the bottom surface 121. The first appearance surface A1 and the second appearance surface A2 are coplanar with each other, so that the contours of the first foot pad 111 and the second foot pad 112 are consistent.

Here, the first appearance surface A1 and the second appearance surface A2 are polyhedral cylinders formed by at least two surfaces, and substantially, the first appearance surface A1 is three surfaces of the first foot pad 111 constantly exposed from the body 120, and the second appearance surface A2 is three surfaces of the second foot pad 112 exposed from the body 120 in the first state.

Please refer to FIG. 2 and FIG. 3 again. The following describes the rotation mechanism of the foot pad module 110 of the embodiment. As shown in the drawings, an axial direction 113a of the rotating shaft 113 of the embodiment is inclined relative to the bottom surface 121. Meanwhile, the first separation surface A5 and the second separation surface A6 are also inclined relative to the bottom surface 121, and the axial direction 113a of the rotating shaft 113 is substantially orthogonal to the first separation surface A5 and the second separation surface A6. In this way, during the rotating process of the second foot pad 112 relative to the first foot pad 111 by the rotating shaft 113, the first separation surface A5 is constantly parallel to and facing the second separation surface A6.

Furthermore, the second foot pad 112 of the embodiment has a hollow column 112a extending from the second separation surface A6 and sleeved on the rotating shaft 113. The second foot pad 112 also has a stopping rib 112b, and the first foot pad 111 has a double-layer round hole 111a with an opening formed on the first separation surface A5 and a pair of stopping walls 111b formed on the double-layer round hole 111a. The rotating shaft 113 and the hollow column 112a are rotatably assembled into the double-layer round hole 111a, and the pair of stopping walls 111b are located on a moving path of the stopping rib 112b, wherein the pair of stopping walls 111b may be regarded as being located at two opposite ends of the pitch diameter of the double-layer round hole 111a, so as to limit the rotatable angle range of the second foot pad 112 relative to the first foot pad 111 to be within 180 degrees.

Next, please refer to FIG. 3. Here, the X-Z plane is used as a reference, each surface of the first foot pad 111 and the second foot pad 112 is orthographically projected onto the X-Z plane, and the explanation is as follows. In the foot pad module 110 in the first state of the embodiment, the projection (that is, the orthographic projection on the X-Z plane) of the second foot pad 112 has a first projection boundary A6P, a second projection boundary A4P, and a third projection boundary A2P, wherein the first projection boundary A6P and the second projection boundary A4P respectively correspond to the second separation surface A6 and the hidden surface A4, and the third projection boundary A2P corresponds to the second appearance surface A2 and is opposite to the second projection boundary A4P, that is, the hidden surface A4 and one of the surfaces of the second appearance surface A2 are the front and back surfaces of the second foot pad 112. Here, the length of the second projection boundary A4P is 13 mm to 15 mm. There is a first included angle θ1 between the first projection boundary A6P and the third projection boundary A2P, and the first included angle θ1 is 45 degrees to 70 degrees, and preferably 45 degrees as shown in the drawing.

In addition, as shown in FIG. 3, in the first state, the projection of the first foot pad 111 has a fourth projection boundary A3P, a sixth projection boundary A5P, and a seventh projection boundary A1P, wherein the fourth projection boundary A3P corresponds to the contact surface A3, the sixth projection boundary A5P corresponds to the first separation surface A5, and the seventh projection boundary A1P corresponds to the first appearance surface A1 and is opposite to the bottom surface 121 (or the projection boundary of the orthographic projection of the bottom surface 121 on the X-Z plane). The third projection boundary A2P is coplanar with the seventh projection boundary A1P.

Figure 5:
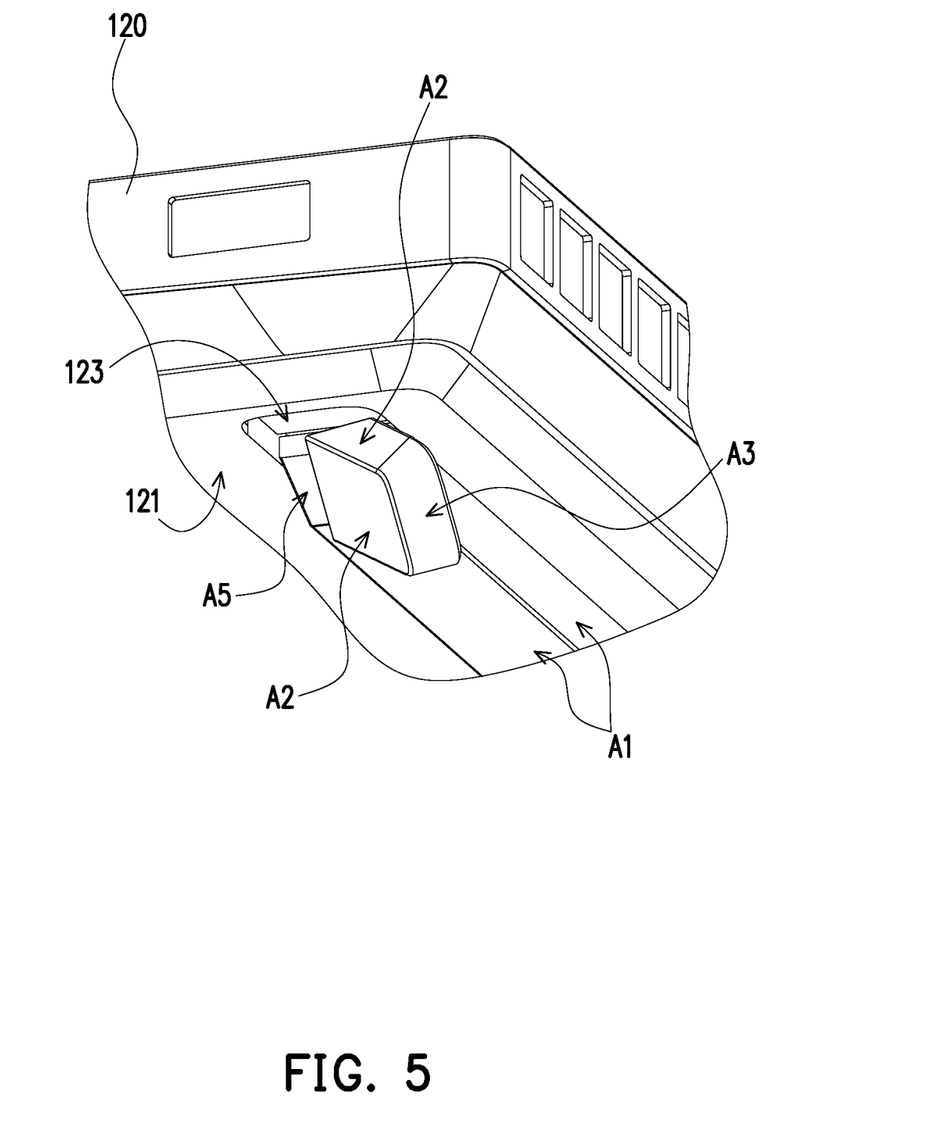
FIG. 5 is a schematic diagram of a temporary state of the electronic device of FIG. 1 during a switching process.
Figure 6:
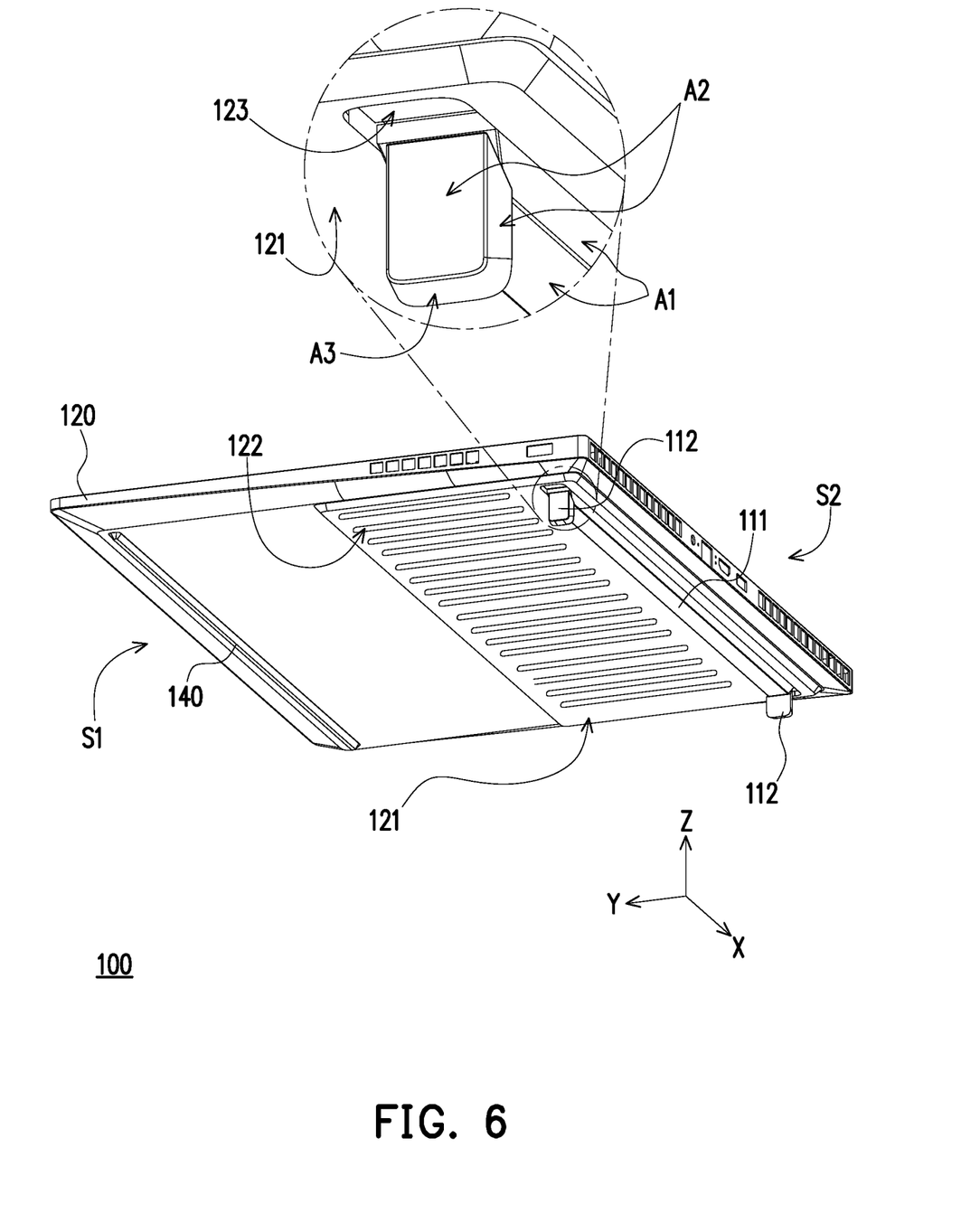
FIG. 6 is a schematic diagram of the electronic device of FIG. 1 in a second state.
Figure 7:
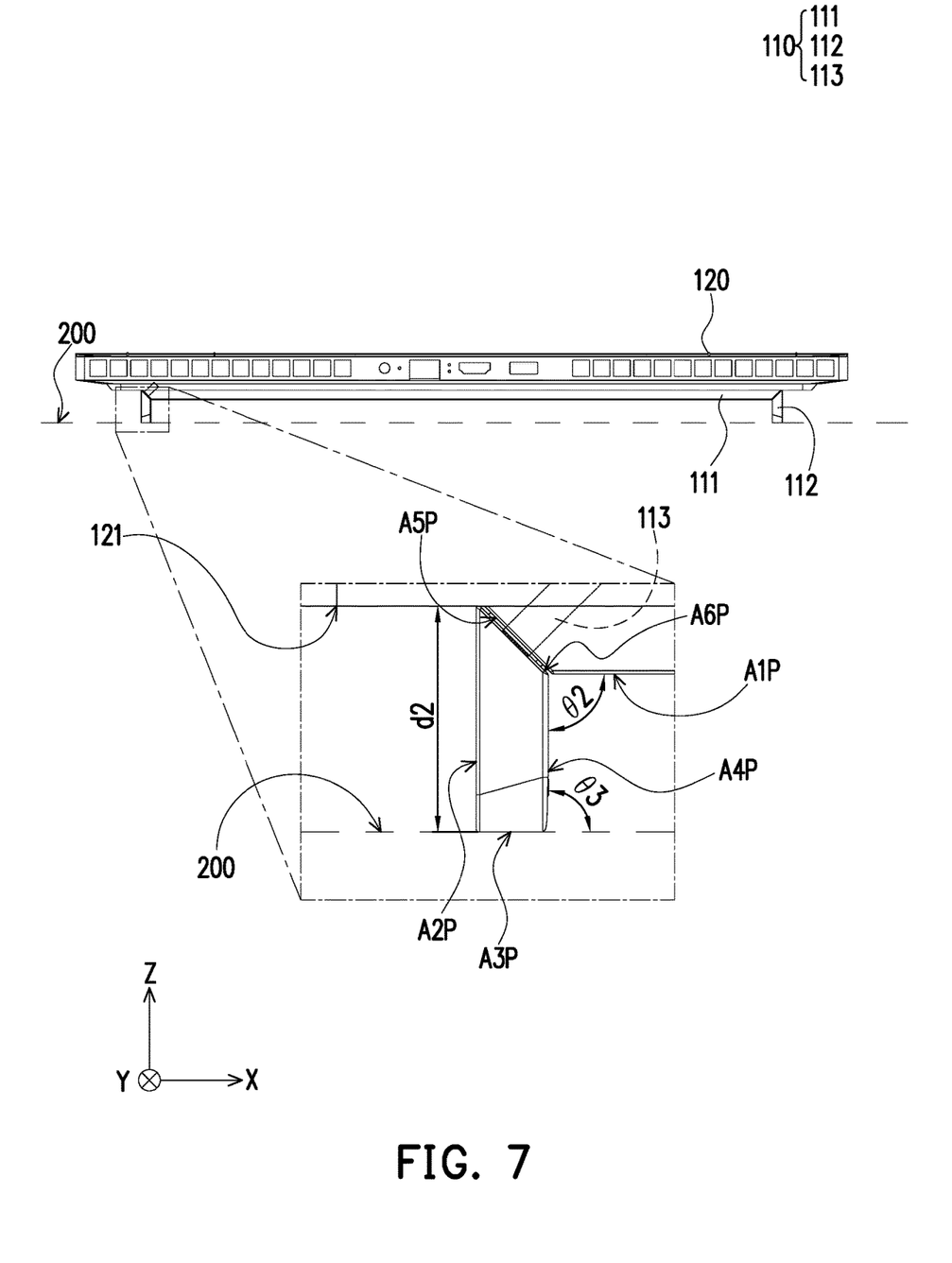
FIG. 7 and FIG. 8 respectively illustrate the electronic device of FIG. 6 from different viewing angles.
Figure 8:
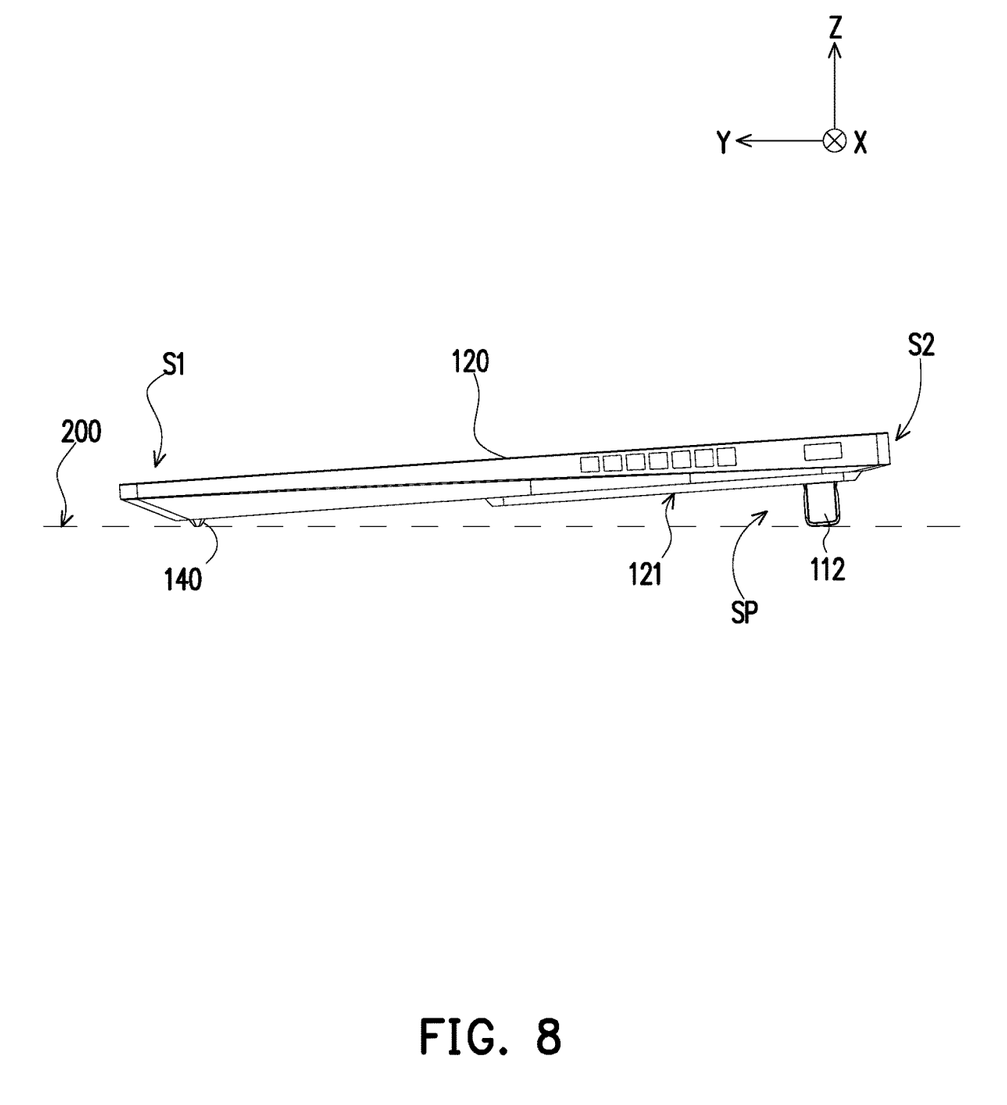

FIG. 5 is a schematic diagram of a temporary state of the electronic device of FIG. 1 during a switching process. FIG. 6 is a schematic diagram of the electronic device of FIG. 1 in a second state. FIG. 7 and FIG. 8 respectively illustrate the electronic device of FIG. 6 from different viewing angles. Please refer to FIG. 1, FIG. 5, and FIG. 6 first. The rotating process of the second foot pad 112 relative to the first foot pad 111 can be clearly seen from the changes in the three drawings. In the embodiment, the body 120 also has a recess 123 located on the bottom surface 121, and in the first state, the hidden surface A4 of the second foot pad 112 faces the recess 123. Then, as shown in FIG. 5, a part of the second foot pad 112 during rotation is moved into the recess 123, so that the recess 123 can provide a turning avoidance space required when rotating the second foot pad 112.

Furthermore, after the second foot pad 112 is rotated by 180 degrees to switch from the first state to the second state shown in FIG. 6 to FIG. 8, the second foot pad 112 protrudes from the first foot pad 111, so that the body 120 is supported on the platform 200 by the second foot pad 112, while also raising the first foot pad 111 to be above the platform 200, so as to form a space SP between the body 120 and the platform 200. At this time, the hidden surface A4 is exposed from the body 120 and faces the first appearance surface A1, and the contact surface A3 is relatively away from the bottom surface 121. There is a second included angle θ2 between the second projection boundary A4P and the seventh projection boundary A1P, and the second included angle θ2 is 40 degrees to 90 degrees, and preferably 90 degrees as shown in the embodiment.

As shown in FIG. 6 or FIG. 1, the body 120 of the electronic device 100 also has multiple openings 122 located on the bottom surface 121, and the electronic device 100 also has a heat dissipation member (for example, a fan, not shown here) disposed in the body 120. The foot pad module 110 in the second state undoubtedly provides a heat dissipation space for the heat dissipation component, so that heat dissipation air can be smoothly discharged from the body 120 through the openings 122 or cold air from the external environment can enter the body 120 through the openings 122 to enhance the heat dissipation effect. In addition, as shown in FIG. 8, the foot pad module 110 in the second state is supported by the second foot pad 112, so that the rear side S2 of the body 120 is higher than the front side S1 and is inclined relative to the platform 200. At this time, the body 120 is only jointly supported by the second foot pad 112 and the fixed foot pad 140, which is also conducive to improving the operating experience of the user. Referring to FIG. 2, FIG. 6, and FIG. 7, in an embodiment of the disclosure, when the electronic device is in the second state, the two hidden surfaces A4 of the two second foot pads 112 are opposite to each other.

Figure 9:
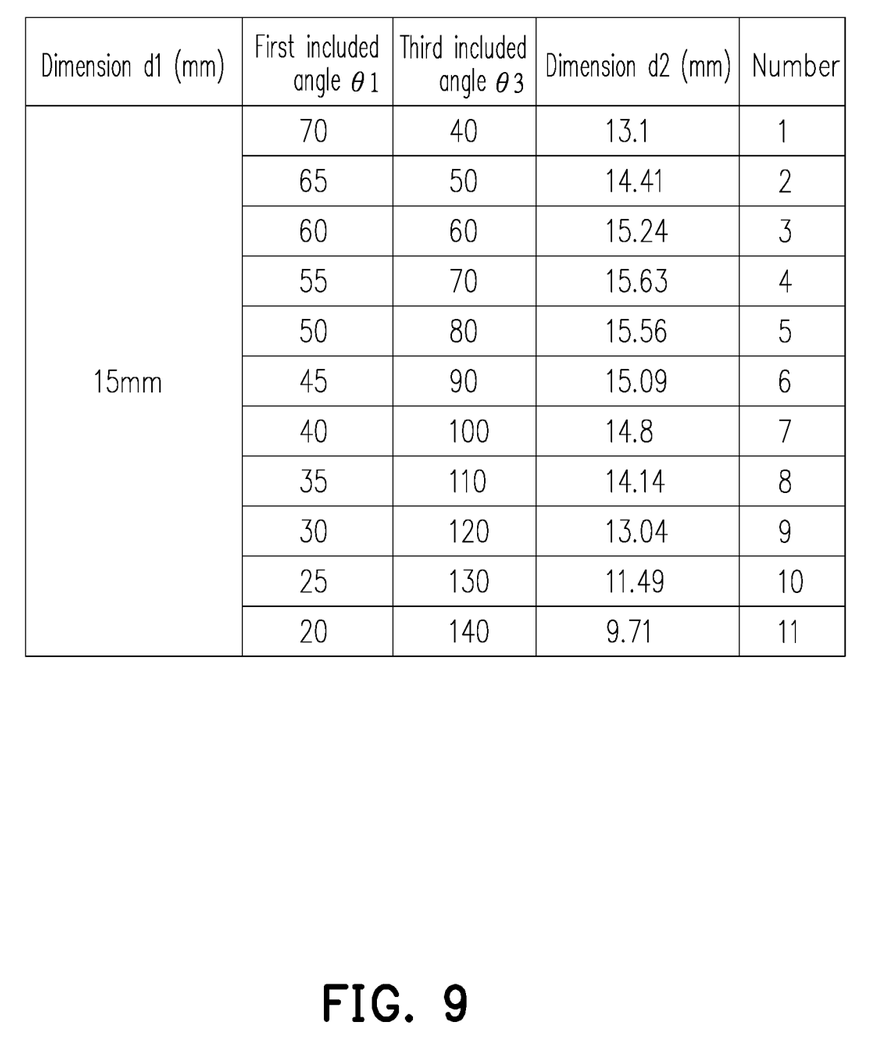
FIG. 9 provides an adjustment plan for dimensions related to a second foot pad.

Please refer to FIG. 2 and FIG. 7 at the same time. As mentioned above, the movable second foot pad 112 can effectively form the space SP to facilitate heat dissipation. Therefore, in the embodiment, the related characteristics of the second foot pad 112 are also exemplified as follows to obtain a better range. FIG. 9 provides an adjustment plan for dimensions related to a second foot pad. Please refer to FIG. 9. An adjustment table as shown in FIG. 9 is further obtained by the dimension of the third projection boundary A2P of the second foot pad 112 and the first included angle θ1 between the third projection boundary A2P and the first projection boundary A6P. In the foot pad module 110 in the second state, the body 120 is supported by the second foot pad 112 to form a relative height of 15 mm with the platform 200 as a preferred state, wherein the reason is that 15 mm can produce a better heat dissipation effect as shown. If the relative height is greater than 15 mm, the generated gain effect will be limited, and if the relative height is less than 15 mm, the heat dissipation effect will be significantly reduced. Therefore, in the case of using 15 mm as a target value for a dimension d1 shown in FIG. 3 to be equal to 15 mm, the first included angle θ1 is correspondingly adjusted to verify a dimension d2 (that is, the relative height from the bottom surface 121 to the platform 200) and a third included angle θ3 formed when rotating to the second state (which is also equivalent to proving the second included angle θ2, which is substantially an interior angle on the same side as the third included angle θ3).

It can be seen from FIG. 9 that the third included angle θ3 obtained by Number 1 to Number 6 is 40 degrees to 90 degrees, and the dimension d2 can all approach the target value of 15 mm. In contrast, the dimension d2 for Number 10 and Number 11 is less than 15 mm, which does not meet the heat dissipation requirement of the embodiment, and although the dimension d2 for Number 7 to Number 9 approaches the target value of 15 mm, the third included angle θ3 is already an obtuse angle (100 degrees to 120 degrees). It can be seen from FIG. 7 that once the third included angle θ3 is an obtuse angle, the second foot pad 112 will be too close to the first foot pad 111 in the second state, which is not conducive to supporting the body 120, that is, the preferred state of the third included angle θ3 of the embodiment should be a right angle or an acute angle.

Figure 10A:
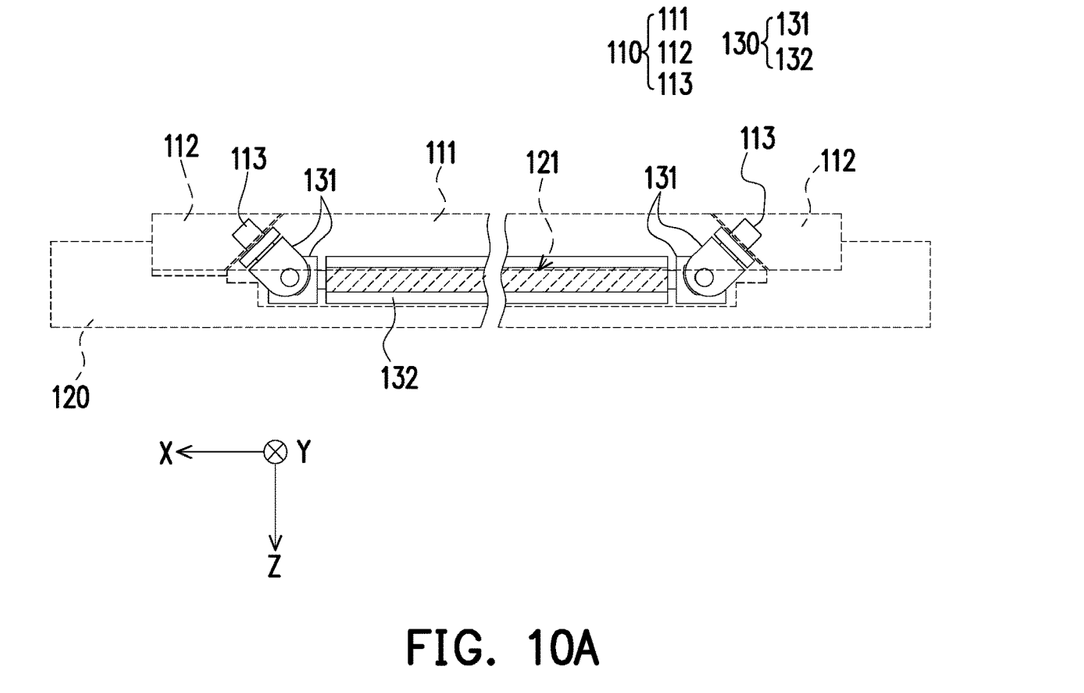
FIG. 10A and FIG. 10B are simple schematic diagrams of an electronic device according to another embodiment of the disclosure.
Figure 10B:
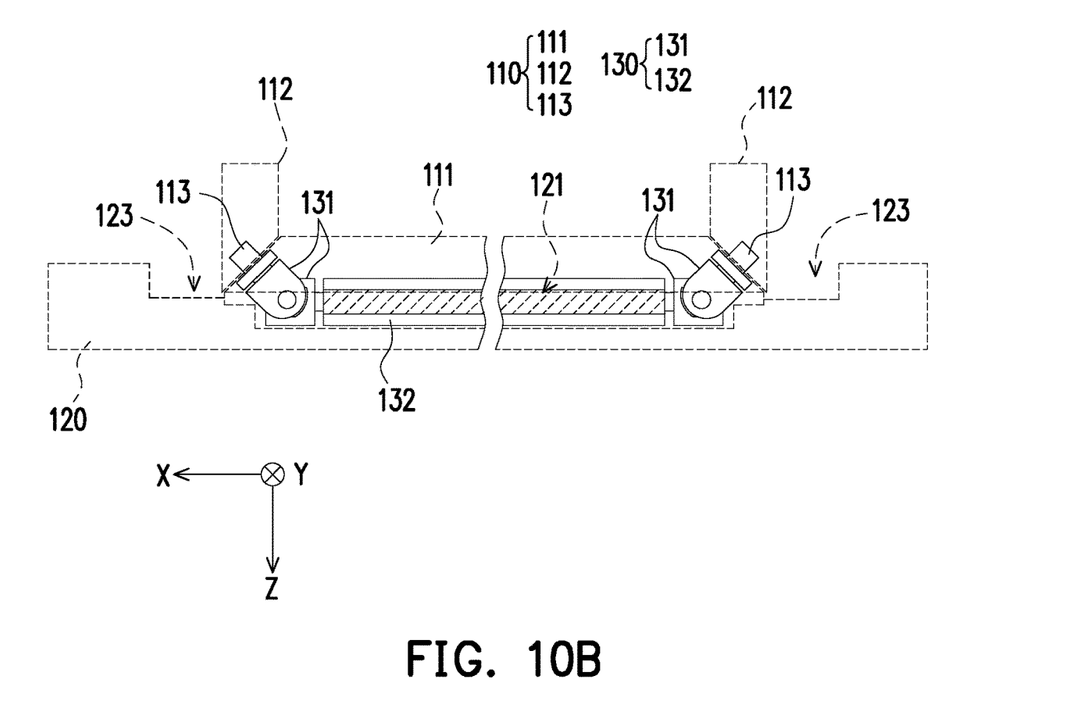

FIG. 10A and FIG. 10B are simple schematic diagrams of an electronic device according to another embodiment of the disclosure. Please refer to FIG. 10A and FIG. 10B at the same time. In the embodiment, the electronic device further includes a synchronization mechanism 130, which includes a pair of universal joints 131 and a transmission member 132. The transmission member 132 passes through the first foot pad 111, and the universal joints 131 are respectively disposed at two opposite ends of the transmission member 132. Each rotating shaft 113 is connected between one universal joint 131 and one second foot pad 112. In this way, the second foot pads 112 located at the two opposite ends of the first foot pad 111 can synchronously rotate through the universal joints 131 and the transmission member 132, that is, the user only needs to apply force to one of the second foot pads 112 to synchronously drive the other second foot pad 112, so as to simplify the operation of the user.

In summary, in the embodiments of the disclosure, the foot pad module is disposed on the bottom surface of the body of the electronic device, wherein the first foot pad is fixed on the body, and the second foot pad is rotatably connected to the first foot pad through the rotating shaft, so that the second foot pad can rotate 180 degrees relative to the first foot pad to be switched between the first state and the second state. In the first state, the body is supported on the platform by the first foot pad and the second foot pad, and in the second state, the second foot pad protrudes from the first foot pad, so that the body is supported on the platform by the second foot pad.

Accordingly, through the movable configuration of the second foot pad and the first foot pad, the user can adjust the state of the foot pad module in response to requirements. In the second state, the second foot pad can deviate from the bottom surface and protrude from the first foot pad to further raise the body, so as to increase the space between the body and the platform. At the same time, in cooperation with the operation of the fan inside the body, the heat dissipation air can be smoothly discharged from the body or the cold air from the external environment can enter the body through the bottom surface of the body to achieve the heat dissipation effect. At the same time, the body raised by the second foot pad can therefore provide the user with a better operating experience.

In an embodiment, the electronic device further disposes the synchronization mechanism, such as including the universal joints and the transmission member, between the second foot pads, so that the user only needs to drive one of the second foot pads to smoothly and synchronously drive the remaining second foot pad, so as to improve the convenience for the user to drive the second foot pads.

What is claimed is:

1. An electronic device with movable foot pad, comprising:
    a body with a bottom surface;
    a foot pad module, disposed on the bottom surface and used to support the body, wherein the foot pad module comprises:
        a first foot pad, fixed to the body;
        at least one second foot pad; and
        at least one rotating shaft, connecting the first foot pad and the second foot pad, wherein the second foot pad is rotated relative to the first foot pad through the rotating shaft, so that the foot pad module is switched between a first state and a second state, and an axial direction of the rotating shaft is inclined relative to the bottom surface, wherein
    in the first state, the body is supported on a platform by the first foot pad and the second foot pad,
    in the second state, the second foot pad is rotated 180 degrees relative to the first foot pad in the axial direction and protrudes from the first foot pad, so that the body is supported on the platform by the second foot pad.

2. The electronic device with movable foot pad according to claim 1, wherein the first foot pad has a first appearance surface, the second foot pad has a second appearance surface and a hidden surface, in the first state, the hidden surface faces the body and is adjacent to the bottom surface, and in the second state, the hidden surface is exposed from the body and faces the first appearance surface.

3. The electronic device with movable foot pad according to claim 2, wherein the first foot pad has a first separation surface adjacent to the first appearance surface, the second foot pad has a second separation surface adjacent to the second appearance surface, and the first separation surface is parallel to and facing the second separation surface and is between the first appearance surface and the second appearance surface.

4. The electronic device with movable foot pad according to claim 3, wherein the second foot pad has a contact surface, the second appearance surface is between the second separation surface and the contact surface, in the first state, the contact surface is adjacent to the bottom surface, and in the second state, the contact surface is relatively away from the bottom surface.

5. The electronic device with movable foot pad according to claim 3, wherein in the first state, a projection of the second foot pad has a first projection boundary, a second projection boundary, and a third projection boundary, the first projection boundary and the second projection boundary respectively correspond to the second separation surface and the hidden surface, the third projection boundary corresponds to the second appearance surface and is opposite to the second projection boundary, there is a first included angle between the first projection boundary and the third projection boundary, and the first included angle is 45 degrees to 70 degrees.

6. The electronic device with movable foot pad according to claim 5, wherein in the first state, a projection of the first foot pad has a sixth projection boundary and a seventh projection boundary, the sixth projection boundary corresponds to the first separation surface, the seventh projection boundary corresponds to the first appearance surface and is opposite to a bottom surface projection boundary, in the second state, there is a second included angle between the second projection boundary and the seventh projection boundary, and the second included angle is 40 degrees to 90 degrees.

7. The electronic device with movable foot pad according to claim 6, wherein in the first state, the third projection boundary is coplanar with the seventh projection boundary.

8. The electronic device with movable foot pad according to claim 5, wherein a length of the second projection boundary is 15 mm to 13 mm.

9. The electronic device with movable foot pad according to claim 3, wherein the second foot pad has a hollow column, and the hollow column extends from the second separation surface and is sleeved on the rotating shaft.

10. The electronic device with movable foot pad according to claim 9, wherein the second foot pad also has a stopping rib, the first foot pad has a double-layer round hole with an opening formed on the first separation surface and a pair of stopping walls formed on the double-layer round hole, the rotating shaft and the hollow column are rotatably assembled into the double-layer round hole, and the pair of stopping walls are located on a moving path of the stopping rib.

11. The electronic device with movable foot pad according to claim 2, wherein in the first state, the first appearance surface and the second appearance surface are coplanar with each other, so that contours of the first foot pad and the second foot pad are consistent.

12. The electronic device with movable foot pad according to claim 2, wherein the foot pad module comprises two of the second foot pads and two of the rotating shafts, respectively disposed at two opposite ends of the first foot pad.

13. The electronic device with movable foot pad according to claim 12, wherein in the second state, two of the hidden surfaces of the two second foot pads are opposite to each other.

14. The electronic device with movable foot pad according to claim 12, further comprising:
a pair of universal joints; and
a transmission member, passing through the first foot pad, wherein the pair of universal joints are respectively disposed at two opposite ends of the transmission member, and each of the rotating shafts is connected between one of the pair of universal joints and one of the second foot pads.

* * * * *